United States Patent
Grobman et al.

(10) Patent No.: US 9,135,450 B2
(45) Date of Patent: Sep. 15, 2015

(54) SYSTEMS AND METHODS FOR PROTECTING SYMMETRIC ENCRYPTION KEYS

(75) Inventors: Steven L. Grobman, El Dorado Hills, CA (US); Jason W. Brandt, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 13/996,453

(22) PCT Filed: Dec. 21, 2011

(86) PCT No.: PCT/US2011/066665
§ 371 (c)(1),
(2), (4) Date: Jun. 20, 2013

(87) PCT Pub. No.: WO2013/095473
PCT Pub. Date: Jun. 27, 2013

(65) Prior Publication Data
US 2014/0157002 A1  Jun. 5, 2014

(51) Int. Cl.
*G06F 21/00* (2013.01)
*G06F 21/60* (2013.01)
*H04L 9/06* (2006.01)
*H04L 9/08* (2006.01)

(52) U.S. Cl.
CPC .............. *G06F 21/60* (2013.01); *H04L 9/0631* (2013.01); *H04L 9/0822* (2013.01); *H04L 2209/127* (2013.01); *H04L 2209/24* (2013.01)

(58) Field of Classification Search
CPC ......... G06F 21/70; G06F 21/72; G06F 21/60; G06F 21/62; H04L 9/0631; H04L 9/0822; H04L 9/0675; H04L 9/0681; H04L 2209/127; H04L 2209/24
See application file for complete search history.

(56) References Cited

U.S. PATENT DOCUMENTS

| | | | |
|---|---|---|---|
| 2003/0126434 A1* | 7/2003 | Lim et al. | 713/164 |
| 2005/0213756 A1* | 9/2005 | Hubert | 380/44 |
| 2007/0033399 A1* | 2/2007 | Takeda | 713/168 |
| 2008/0205651 A1 | 8/2008 | Goto et al. | |
| 2009/0052659 A1 | 2/2009 | Gueron et al. | |
| 2009/0220071 A1 | 9/2009 | Gueron et al. | |

FOREIGN PATENT DOCUMENTS

| | | |
|---|---|---|
| TW | 201121279 A | 6/2011 |
| TW | 201140369 A | 11/2011 |

OTHER PUBLICATIONS

Office Action and Taiwan Search Report from foreign counterpart Taiwan Patent Application No. 101142871, mailed Oct. 3, 2014, 15 pages.

* cited by examiner

*Primary Examiner* — Yogesh Paliwal
(74) *Attorney, Agent, or Firm* — Nicholson De Vos Webster & Elliot LLP

(57) ABSTRACT

Systems and methods for protecting symmetric encryption keys when performing encryption are described. In one embodiment, a computer-implemented method includes retrieving at least one real key from a secure area and executing, with a processor, a key transform instruction to generate at least one transformed key based on receiving the at least one real key. The at least one transformed key is an encrypted version of at least one round key that is encrypted by the processor using the at least one real key. The processor is able to decrypt the at least one transformed key and encrypt the at least one round key.

13 Claims, 7 Drawing Sheets

SYSTEMS AND METHODS FOR PROTECTING SYMMETRIC ENCRYPTION KEYS

CROSS-REFERENCE TO RELATED APPLICATION

This patent application is a U.S. National Phase Application under 35 U.S.C. §371 of International Application No. PCT/US2011/066665, filed Dec. 21, 2011, entitled SYSTEMS AND METHODS FOR PROTECTING SYMMETRIC ENCRYPTION KEYS.

TECHNICAL FIELD

Embodiments of the invention relate to protecting symmetric encryption keys when performing host based encryption.

BACKGROUND

Advanced encryption standard (AES) encryption has become the industry standard for symmetric encryption and is used in a wide range of data protection applications and scenarios. Three primary mechanisms exist to implement AES encryption on a platform including generic software, hardware accelerators, and software that utilizes specialized instructions (e.g., AES instruction set with new instructions (AES-NI)). These implementation methods have various security, performance, and power implications. Power and performance characteristics will vary by the workload characteristic. One advantage of performing a cryptographic implementation in a hardware accelerator or IP block is that the underlying AES keys are not exposed outside the boundaries of the IP implementation. On software implementations including those based on AES-NI, the underlying encryption keys are subject to greater exposure and generally rely on the operating system protection and integrity to safeguard the keys from both software and hardware attacks.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
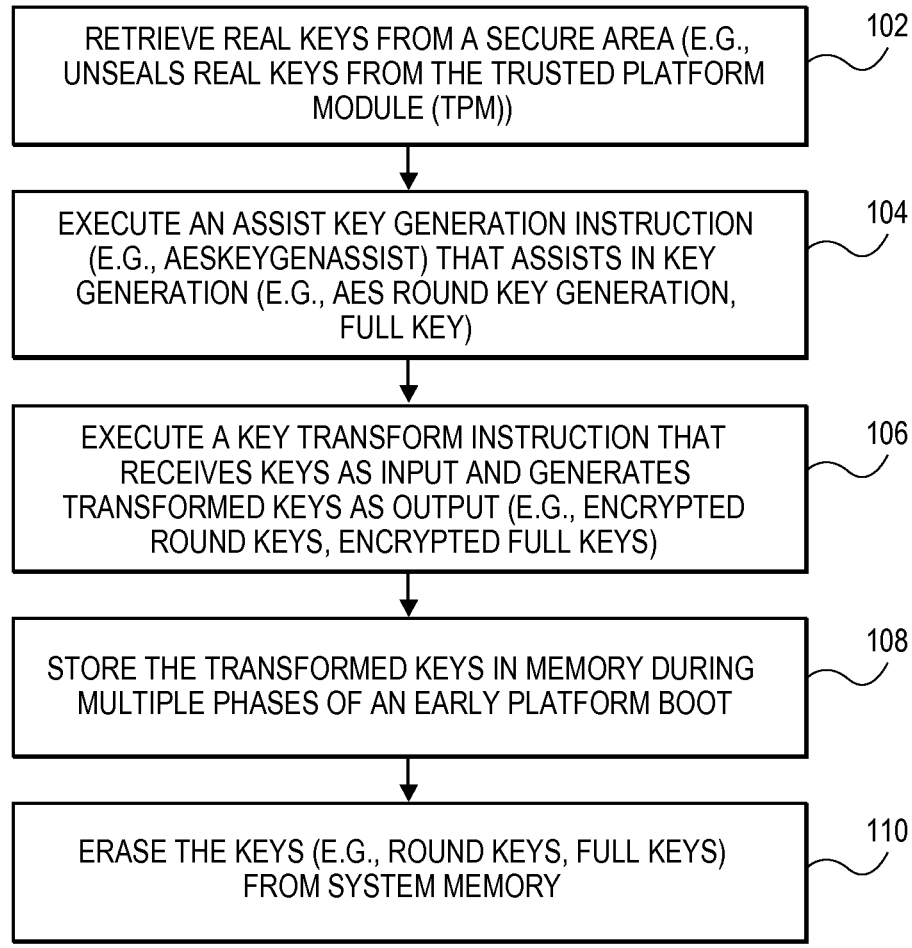
FIG. 1 illustrates a flow diagram of one embodiment for a computer-implemented method 100 of protecting symmetric encryption keys when performing host based encryption in accordance with one embodiment of the invention.

Systems and methods for protecting symmetric encryption keys when performing host based encryption are described. In one embodiment, a computer-implemented method includes retrieving at least one real key from a secure area and executing, with a processor, a key transform instruction to generate at least one transformed key based on receiving the at least one real key. The at least one transformed key is an encrypted version of at least one round key that is encrypted by the processor using the at least one real key. The processor is able to decrypt the at least one transformed key and encrypt the at least one round key. Data is encrypted at the moment it is created for host based encryption.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that embodiments of the invention may be practiced without such specific details. In other instances, control structures and gate level circuits have not been shown in detail to avoid obscuring embodiments of the invention. Those of ordinary skill in the art, with the included descriptions, will be able to implement appropriate logic circuits without undue experimentation.

In the following description, certain terminology is used to describe features of embodiments of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like. The interconnect between chips each could be point-to-point or each could be in a multi-drop arrangement, or some could be point-to-point while others are a multi-drop arrangement.

Embodiments of the invention mitigate many hardware and software attack scenarios that steal the underlying keys. The design for symmetric key protection proposes enhancements for protection of symmetric keys. For example, the design includes enhancements to the AES-NI implementation that enables AES-NI to be used for efficient implementations of the AES algorithm with the added benefit that the underlying keys would not be exposed in memory and therefore mitigate some of the risks in using AES-NI in lieu of a dedicated hardware crypto accelerator. It should be noted that the proposed enhancements to AES-NI is an example implementation of the present design and that it would have a similar capability on any set of instructions that implement symmetric cryptographic operations (or portions of cryptographic operations such as rounds).

In order to mitigate loss of keying material when software vulnerabilities exist, the present design includes a method that uses an encrypted form of the AES round keys that are passed to the AESNI instructions instead of the true round keys. These round keys are encrypted by the CPU using either a session key that is randomly derived at power initialization or a unique key to each CPU (or system on chip (SOC)) that is derived and persisted internally through a derived key based on fusing. The derived key for each CPU/SOC may also be derived using a combination of fuses, hidden keys in the register transfer language (RTL), and possibly physical unclonable functions.

The two potential implementations are described below and nothing prevents one or both techniques from being implemented on a platform.

FIG. 1 illustrates a flow diagram of one embodiment for a computer-implemented method 100 of protecting symmetric encryption keys when performing host based encryption in accordance with one embodiment. The method 100 is performed by processing logic that may comprise hardware (circuitry, dedicated logic, etc.), software (such as is run on a general purpose computer system or a dedicated machine or a device), or a combination of both. In one embodiment, the method 100 is performed by processing logic associated with the host based platform discussed herein.

At block 102, the processing logic retrieves real keys from a secure area (e.g., unseals real keys from the trusted platform module (TPM)). At block 104, the processing logic executes an assist key generation instruction (e.g., AESKEYGENASSIST) that assists in key generation (e.g., AES round key generation, full key). At block 106, the processing logic executes a key transform instruction that receives keys as input and generates transformed keys as output (e.g., encrypted round keys, encrypted full keys). At block 108, the transformed keys are stored in memory during multiple phases of an early platform boot. The transformed keys are only valid for the current boot cycle and platform. At block 110, the keys (e.g., round keys, full keys) are erased from system memory.

As a host platform boots from reset, the number of code paths increase and accumulate the code base of the operating system, device drivers, and other large quantities of code that contain potential current or future vulnerabilities. Therefore, the probability that the system is vulnerable to exploitation grows as a function of T, where T is equal to an amount of software code executed and correlates with an amount of time after reset. If critical keys can be transformed into a form that is only useable on the platform CPU core(s) for this particular boot, then loss of the transformed keys does not reveal the untransformed key and the stolen transformed keys are worthless after the next reboot even if stolen by an attacker. This only applies if a random number is used to encrypt those keys instead of using a key that is randomly generated at manufacture and fused or permanently configured into the CPU, which will be the same each boot.

Figure 2:
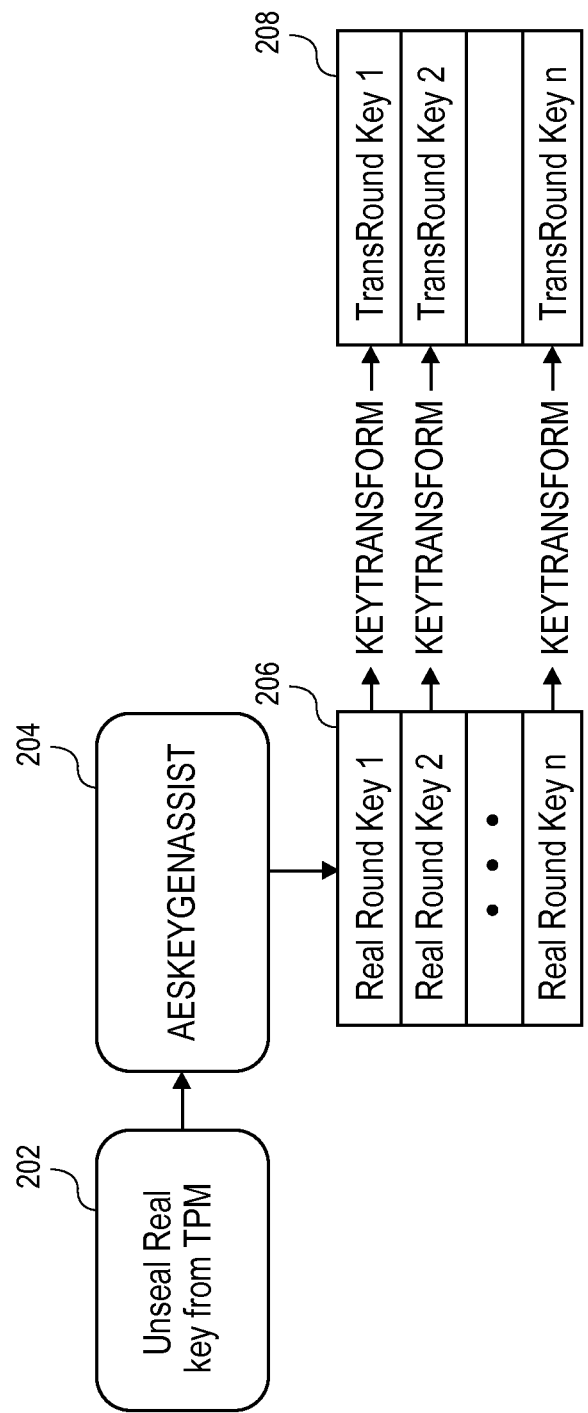
FIG. 2 illustrates a block diagram that shows a mechanism to create the transformed keys in accordance with one embodiment of the invention.

FIG. 2 illustrates a block diagram that shows a mechanism to create the transformed keys in accordance with one embodiment. The mechanism includes unsealing a real key from the TPM at block 202, executing an assist key generation instruction (e.g., AESKEYGENASSIST) that assists in AES key generation (e.g., AES round key generation), and introducing a new instruction (e.g., KEYTRANSFORM) that will take as input a true round key (e.g., real round key 1, 2, etc.) of block 206 and store to a memory location 208 an encrypted version of the key (e.g., TransRound key 1, TransRound key 2, etc.). The actual key used to do the encryption is only available to the CPU and is not extractable. This enables encrypted keys to be placed in memory during multiple phases of early boot including boot-loader execution or early stages of the OS boot process. The encrypted keys are only valid for the current boot cycle and platform. In another embodiment, a single key is given for encryption and after a number of rounds the CPU automatically builds up the round keys and stores them.

It is assumed that the true keys are sealed in IP and the IP will only release them during these early stages of the boot process such as through sealing to platform configured registers on the platform's trusted platform module (TPM). The TPM offers facilities for the secure generation of cryptographic keys, and limitation of their use, in addition to a hardware pseudo-random number generator. It also includes capabilities such as remote attestation and sealed storage. In one embodiment, round keys are transformed instead of the full native AES keys because the round keys are fixed 128 bit keys and independent of AES key size and mode requirements. In an embodiment, the full keys are transformed by the new instruction. Once the key transform instruction executes to store the encrypted form of the key in memory, the true round key should be erased from system memory. The "keytransform" instruction can operate at any privilege level although it will generally be most useful at CPL0.

The encrypted round key may be stored in an internal table. An instruction can be designed to more easily look up the encrypted round key in the internal table (e.g., having the round number passed in and using the round number to look up in the table).

In an embodiment, the CPU has limited storage for the encrypted keys and software specifies an index of which key that it is desired to use. One advantage of the index is that because there is no cache (i.e., either hit in the table or it doesn't work), the design may include internal performance optimization mechanisms like only allowing the lookup of the decrypted round key if the linear address of the instruction requesting the decryption matches what was logged before. In this case, the encrypt instruction would read "store my round key X into entry 3 of the table."

An alternate implementation could be created where the internal encryption key is persisted in the CPU. This has the benefit that keys can be bound to the platform by any application and do not need to rely on early boot code. When applications are initially installed, the applications would generate transformed keys for the platform and then the true keys would not be needed again. This approach provides protection against the keys being usable on another platform, but does not prevent stolen transformed keys from being used by a rogue alternate malware software stack.

Figure 3:
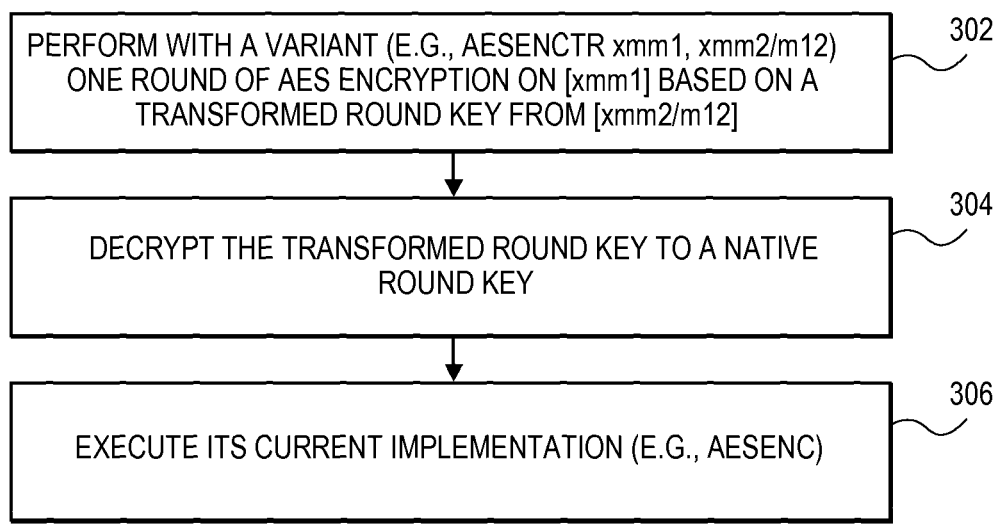
FIG. 3 illustrates a flow diagram of one embodiment for a computer-implemented method 300 for encryption using symmetric encryption keys in accordance with one embodiment of the invention.

FIG. 3 illustrates a flow diagram of one embodiment for a computer-implemented method 300 for encryption using symmetric encryption keys in accordance with one embodiment. The method 300 is performed by processing logic that may comprise hardware (circuitry, dedicated logic, CPU, etc.), software (such as is run on a general purpose computer system or a dedicated machine or a device), or a combination of both. In one embodiment, the method 300 is performed by a CPU.

In one embodiment, in order to use a transformed round key a new variant of the four AES-NI instructions (e.g., AESENC, AESENCLAST, AESDEC, and AESDELAST) would be implemented. The new instructions may be called AESENCTR, AESENCLASTTR, AESDECTR, and AESDELASTTR. Each of these variants would operate identically to their current implementation except that these variants would accept a transformed round key in lieu of a native round key. For example, at block 302, the processing logic with the variant (AESENCTR xmm1, xmm2/m12) performs one round of AES encryption on [xmm1] based on a transformed round key from [xmm2/m12]. Internally, the processing logic (e.g., CPU) decrypts the transformed round key to a native round key at block 304 and then executes its current implementation (e.g., AESENC) at block 306.

When AES is used to encrypt or decrypt a block of data, it will iterate through the roundkeys for every 16 byte block. The set of round keys for the entire block remain unchanged throughout the encryption or decryption operation. This property enables aggressive internal caching of a mapping that maps transformed round keys to its corresponding real round key. Decryption of the transformed round key only needs to occur on a cache miss. As an example, assume that the design needs to perform an AES-256 encryption operation, which requires 14 round keys, on a 4K block of data. In an embodiment, a round key transform cache can accommodate all 14 keys and only one AES operation using the transform paradigm is running at a time. As a baseline, a normal AES-NI encryption requires 256*14=3484 calls to AESENC (e.g., 4K/16B=256 and 14 rounds for 256 bit AES). In comparison, if it is assumed that the micro architecture implementation uses AESDEC to decrypt the round key on a cache miss, then there would be an additional 140 calls to AESDEC. Each 128 bit round key is encrypted with AES-128 which requires 10 rounds, so 14*10=140 for a total of 3724 AESENC/AESDEC calls which is roughly a 7% overhead (plus transform cache lookup overhead) on the first block processed. It should be noted that all subsequent 4K blocks in the data set will not incur a cache miss and will return to the initial 3484 calls. Thus, the overhead only includes the transform key cache lookup.

In another embodiment, a table or other structure is used instead of a cache. The CPU may want to store the round keys generated from the random number/fuses that it uses in the beginning and not store the actual random number/fuses. Having those hardware-based round keys speeds up significantly when an encrypt or decrypt of a software-specified round key is needed. If the hardware-based round keys are not present, then the original random number or fuses are not needed. The random number may be combined with something else (e.g., fuses or hidden values on the CPU) just in case someone is able to perturb the random number. In a similar manner, the fuses may be combined with something else.

Currently, symmetric encryption can occur either in an accelerator (or IP block) in which case the key can be protected. In current software approaches, which may be better suited for certain workloads, the key protection properties do not exist from the attacks described herein.

In current software or AES-NI implementations of an encryption or decryption algorithm, security vulnerabilities in the operating system or application enable the attacker to steal both the encryption keys and the clear-text data. There is substantial value in providing enhanced protection of the keys even if encrypted data is compromised or stolen during an incident as described below. This enhanced protection minimizes the implication of vulnerability when exploitation is unknown. One of the challenges with an identified vulnerability in an operating system is that it is not always clear whether or not an exploit has occurred. When organizations identify that a vulnerability exists, then corrective action can be taken such as deploying a software patch to prevent the vulnerability from being exploited. One issue associated with an unknown exploitation is that an organization does not necessarily know which platforms (if any) the exploit has been used by a malicious attacker. Operating system vulnerabilities can provide access to memory where symmetric keys are stored in current software implementations in addition to the ability to use the decryption implementation to access data. Thus, the organization would need to change encryption keys on all platforms impacted as well as re-encrypt all of the data on every device that the vulnerability was present on if the organization wanted to ensure that an attacker could not use keys that may have been stolen. If keys were stolen, the keys not only would be useful in accessing data that was present at the time of the vulnerability, but future data that would be encrypted with the same key. If the encryption capability is implemented in a manner such that merely the decryption implementation is vulnerable during the period of vulnerability, but the keys are protected, then the systems can be patched without revocation of keys and without the need to re-encrypt all of the current data. This is a massive benefit when common software is applied to large sets of devices such as PC clients, phones, tablets, and consumer electronics devices because an OS vulnerability will impact very large populations of users and protection of the underlying symmetric keys will greatly reduce cost and effort in returning platforms to a known secure state.

There is substantial value in providing enhanced protection of the keys because decryption can be moved to another platform or software stack. Obtaining the key enables the attacker to implement decryption in a secondary implementation outside of the compromised system and is not constrained to using the compromised implementation as the only means to monitor or force conversion of data from encrypted to plaintext. For example, consider the classic "Cold-Boot" attack. In this scenario, once the key is obtained, the attacker can reboot the machine to an OS and access/decrypt any data on the platform. If the vulnerability was a software exploit that allowed access to the decryption implementation, the attacker could monitor data conversion but would need to force any data that the attacker desired conversion on through the compromised implementation. This may be impractical in many scenarios when there is a vast amount of data and it is unknown where the valuable data to be accessed is located. One scenario in which this can be demonstrated is when a system identifies an exploit at a point in time after boot. In a system where the exploit can steal the keys, there is an opportunity to go after the data at any point in the future. In a scenario where merely access to the encryption capability is compromised, the data loss will be limited to the quantity of data that can be passed through the compromised implementation between exploit and exploit detection.

There is substantial value in providing enhanced protection of the keys because symmetric key re-keying and revocation is expensive and often impractical. Symmetric keys used in AES are generally used as the lowest level of encryption to protect both data at rest (in storage) and in motion (being transferred) for every block of data that the key is protecting. Because the key is required for access to every block of data that it has every encrypted, revoking a compromised key is challenging because every block of data that has been encrypted needs to be accessible such that it can be re-encrypted with new keying material. This not only includes active data on the system being protected, but also any additional copies that may have been persisted in other mediums such as backup or offline storage. Theft of keys would enable attacks on all data that was ever encrypted with the keys including data that is no longer accessible on the device.

The present design provides the concept of creating an encrypted round key (or true key) that only the platform's application processor is able to transform to the real round (or true) key. The present design provides the use of encrypted platform bound/power up unique keys in host based software crypto operations, the interaction between key sealing mechanisms (such as a TPM) and early platform boot to move keys into a transformed state when the host has executed limited code to reduce the trusted code base and area of attack, and a mechanism to efficiently cache the transformed keys to make it such that minimal overhead is introduced by encrypting all of the round keys.

Figure 4:
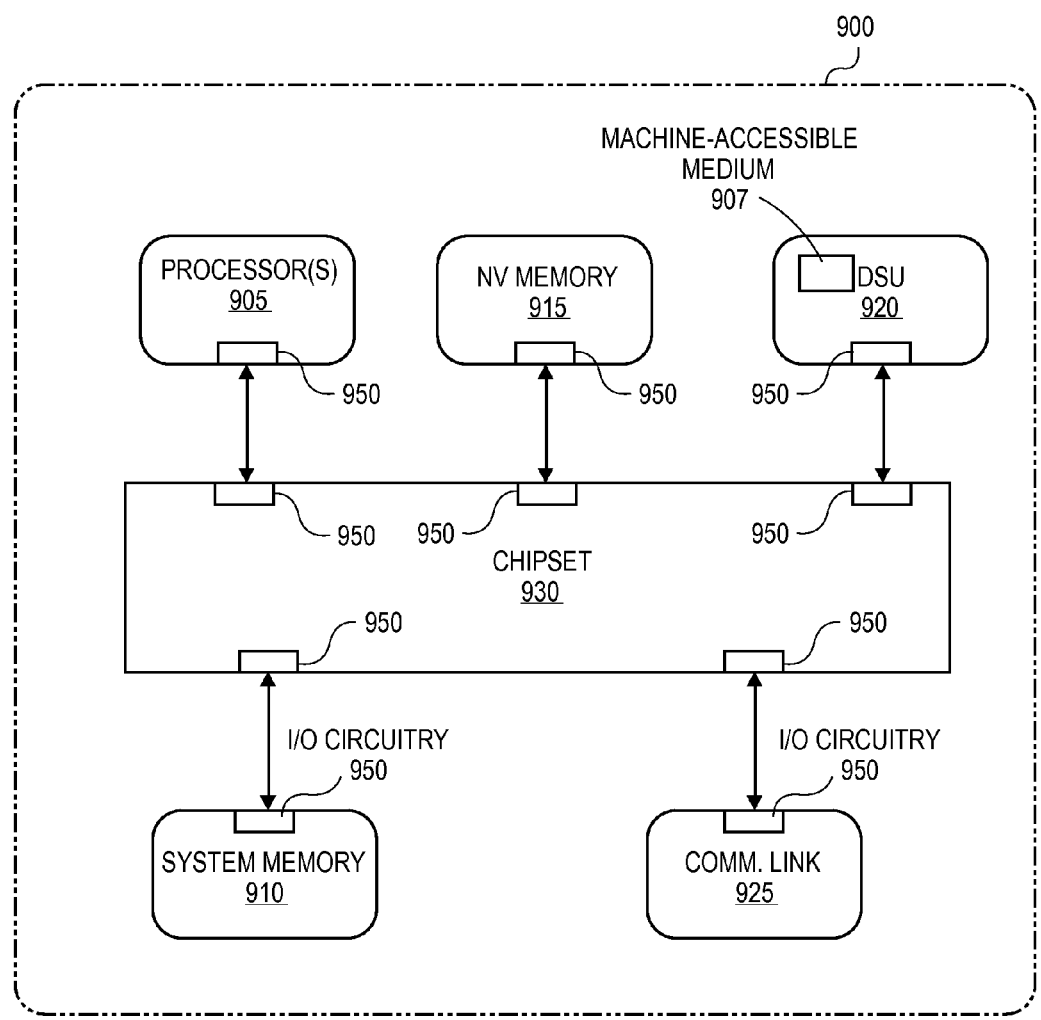
FIG. 4 illustrates a functional block diagram illustrating a system 900 implemented in accordance with one embodiment of the invention.

FIG. 4 illustrates a functional block diagram illustrating a system 900 implemented in accordance with one embodiment. The illustrated embodiment of processing system 900 includes one or more processors (or central processing units), system memory 910, nonvolatile ("NV") memory 915, a data storage unit ("DSU") 920, a communication link 925, and a chipset 930. The illustrated processing system 900 may represent any computing system including a desktop computer, a notebook computer, a workstation, a handheld computer, a server, a blade server, or the like.

The elements of processing system 900 are interconnected as follows. Processor(s) 905 is communicatively coupled to system memory 910, NV memory 915, DSU 920, and communication link 925, via chipset 930 to send and to receive instructions or data thereto/therefrom. In one embodiment, NV memory 915 is a flash memory device. In other embodiments, NV memory 915 includes any one of read only memory ("ROM"), programmable ROM, erasable programmable ROM, electrically erasable programmable ROM, or the like. In one embodiment, system memory 910 includes random access memory ("RAM"), such as dynamic RAM ("DRAM"), synchronous DRAM, ("SDRAM"), double data rate SDRAM ("DDR SDRAM"), static RAM ("SRAM"), and the like. DSU 920 represents any storage device for software data, applications, and/or operating systems, but will most typically be a nonvolatile storage device. DSU 920 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 920 is illustrated as internal to processing system 900, DSU 920 may be externally coupled to processing system 900. Communication link 925 may couple processing system 900 to a network such that processing system 900 may communicate over the network with one or more other computers. Communication link 925 may include a modem, an Ethernet card, a Gigabit Ethernet card, Universal Serial Bus ("USB") port, a wireless network interface card, a fiber optic interface, or the like.

The DSU 920 may include a machine-accessible medium 907 on which is stored one or more sets of instructions (e.g., software) embodying any one or more of the methods or functions described herein. The software may also reside, completely or at least partially, within the processor(s) 905 during execution thereof by the processor(s) 905, the processor(s) 905 also constituting machine-accessible storage media.

While the machine-accessible medium 907 is shown in an exemplary embodiment to be a single medium, the term "machine-accessible medium" should be taken to include a single medium or multiple media (e.g., a centralized or distributed database, and/or associated caches and servers) that store the one or more sets of instructions. The term "machine-accessible medium" shall also be taken to include any medium that is capable of storing, encoding or carrying a set of instructions for execution by the machine and that cause the machine to perform any one or more of the methodologies of embodiments of the present invention. The term "machine-accessible medium" shall accordingly be taken to include, but not be limited to, solid-state memories, optical, and magnetic media.

Thus, a machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

As illustrated in FIG. 4, each of the subcomponents of processing system 900 includes input/output ("I/O") circuitry 950 for communication with each other. I/O circuitry 950 may include impedance matching circuitry that may be adjusted to achieve a desired input impedance thereby reducing signal reflections and interference between the subcomponents.

It should be appreciated that various other elements of processing system 900 have been excluded from FIG. 4 and this discussion for the purposes of clarity. For example, processing system 900 may further include a graphics card, additional DSUs, other persistent data storage devices, and the like. Chipset 930 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 930. Correspondingly, processing system 900 may operate without one or more of the elements illustrated. For example, processing system 900 need not include DSU 920.

Figure 5:
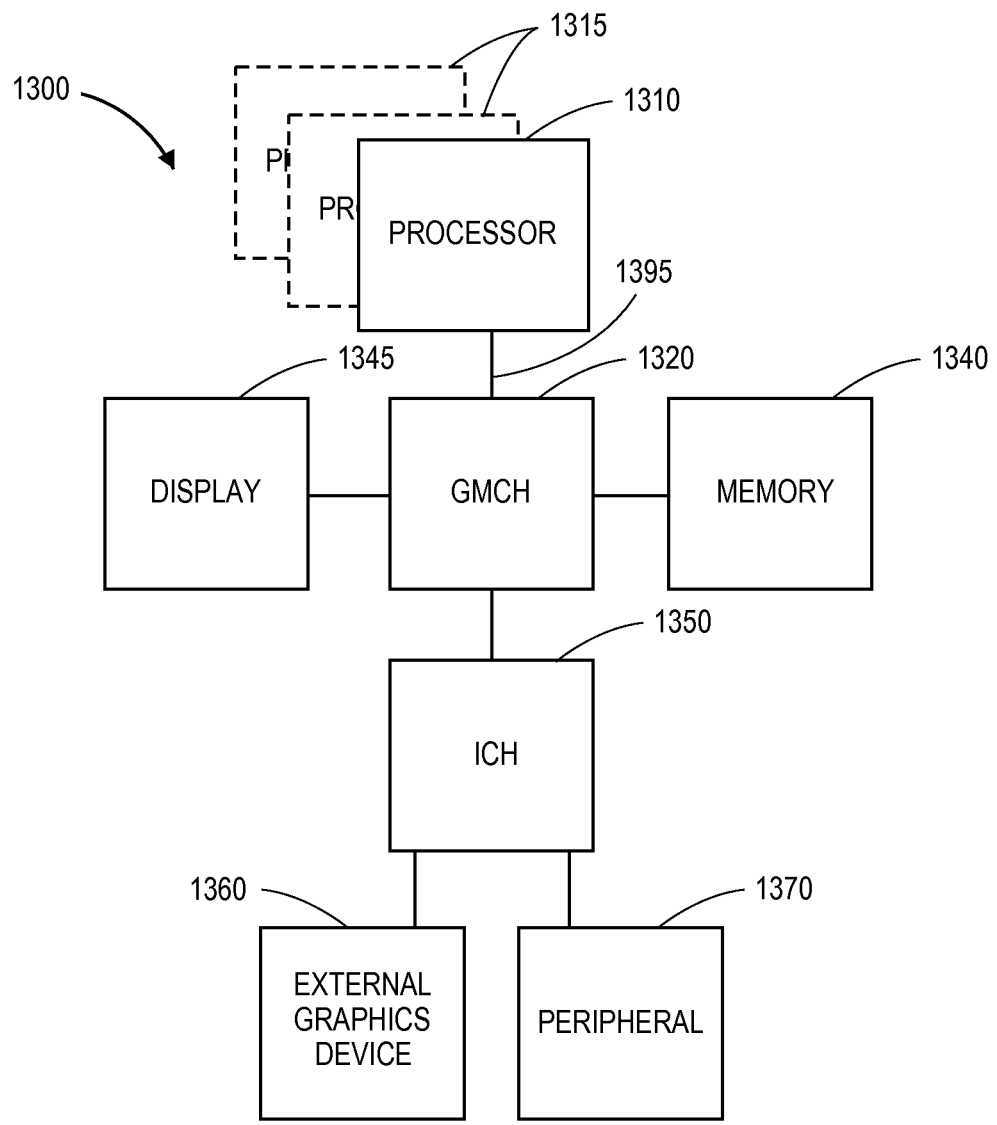
FIG. 5 is a block diagram of a system 1300 in accordance with one embodiment of the invention.

FIG. 5 illustrates a block diagram of a system 1300 in accordance with one embodiment. The system 1300 may include one or more processors 1310, 1315, which are coupled to graphics memory controller hub (GMCH) 1320. The optional nature of additional processors 1315 is denoted in FIG. 5 with broken lines. The system 1300 further includes memory 1340 coupled to the one or more processing units.

FIG. 5 illustrates that the GMCH 1320 may be coupled to the memory 1340 that may be, for example, a dynamic random access memory (DRAM). The DRAM may, for at least one embodiment, be associated with a non-volatile cache.

The GMCH 1320 may be a chipset, or a portion of a chipset. The GMCH 1320 may communicate with the processor(s) 1310, 1315 and control interaction between the processor(s) 1310, 1315 and memory 1340. The GMCH 1320 may also act as an accelerated bus interface between the processor(s) 1310, 1315 and other elements of the system 1300. For at least one embodiment, the GMCH 1320 communicates with the processor(s) 1310, 1315 via a multi-drop bus, such as a frontside bus (FSB) 1395.

Furthermore, GMCH 1320 is coupled to a display 1345 (such as a flat panel display). GMCH 1320 may include an integrated graphics accelerator. GMCH 1320 is further coupled to an input/output (I/O) controller hub (ICH) 1350, which may be used to couple various peripheral devices to system 1300. Shown for example in the embodiment of FIG. 5 is an external graphics device 1360, which may be a discrete graphics device coupled to ICH 1350, along with another peripheral device 1370.

Alternatively, additional or different processors may also be present in the system 1300. For example, additional processor(s) 1315 may include additional processors(s) that are the same as processor 1310, additional processor(s) that are heterogeneous or asymmetric to processor 1310, accelerators (such as, e.g., graphics accelerators or digital signal processing (DSP) units), field programmable gate arrays, or any other processor. There can be a variety of differences between the physical resources 1310, 1315 in terms of a spectrum of metrics of merit including architectural, microarchitectural, thermal, power consumption characteristics, and the like. These differences may effectively manifest themselves as asymmetry and heterogeneity amongst the processing elements 1310, 1315. For at least one embodiment, the various processing elements 1310, 1315 may reside in the same die package.

Figure 6:
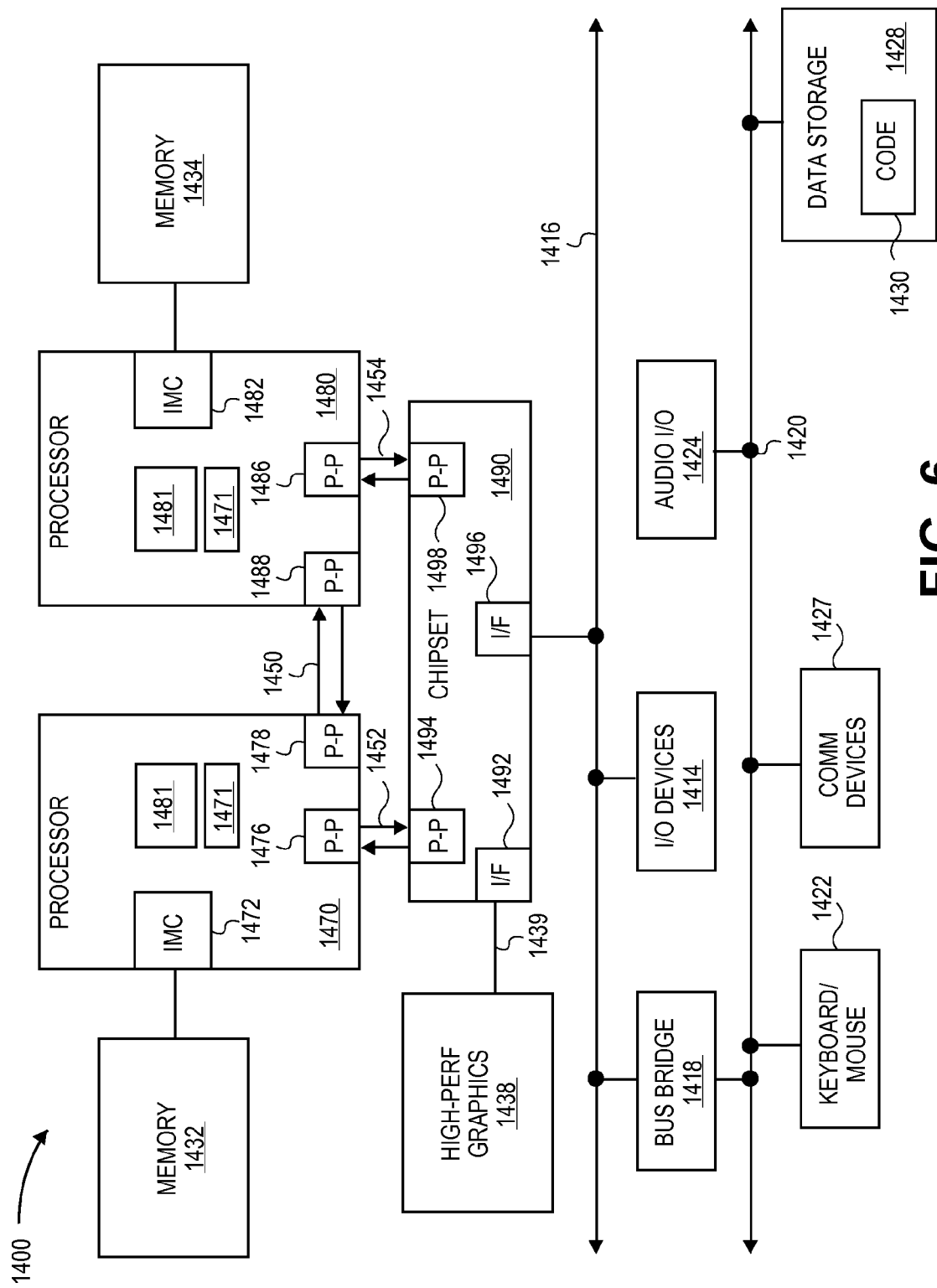
FIG. 6 is a block diagram of a second system 1400 in accordance with an embodiment of the invention.

Referring now to FIG. 6, shown is a block diagram of a second system 1400 in accordance with an embodiment of the present invention. As shown in FIG. 6, multiprocessor system 1400 is a point-to-point interconnect system, and includes a first processor 1470 and a second processor 1480 coupled via a point-to-point interconnect 1450. Alternatively, one or more of processors 1470, 1480 may be an element other than a processor, such as an accelerator or a field programmable gate array. While shown with only two processors 1470, 1480, it is to be understood that the scope of embodiments of the present invention is not so limited. In other embodiments, one or more additional processing elements may be present in a given processor.

Processor 1470 may further include an integrated memory controller hub (IMC) 1472 and point-to-point (P-P) interfaces 1476 and 1478. Similarly, second processor 1480 may include a IMC 1482 and P-P interfaces 1486 and 1488. Processors 1470, 1480 may exchange data via a point-to-point (PtP) interface 1450 using PtP interface circuits 1478, 1488. As shown in FIG. 6, IMC's 1472 and 1482 couple the processors to respective memories, namely a memory 1432 and a memory 1434, which may be portions of main memory locally attached to the respective processors.

Processors 1470, 1480 may each exchange data with a chipset 1490 via individual P-P interfaces 1452, 1454 using point to point interface circuits 1476, 1494, 1486, 1498. Chipset 1490 may also exchange data with a high-performance graphics circuit 1438 via a high-performance graphics interface 1439.

As shown in FIG. 6, each of processors 1470 and 1480 includes one or more processing units 1471. A shared cache (e.g., 1481) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of embodiments of the present invention is not so limited.

As shown in FIG. 6, various I/O devices 1414 may be coupled to first bus 1416, along with a bus bridge 1418 which couples first bus 1416 to a second bus 1420. In one embodiment, second bus 1420 may be a low pin count (LPC) bus. Various devices may be coupled to second bus 1420 including, for example, a keyboard/mouse 1422, communication devices 1426 and a data storage unit 1428 such as a disk drive or other mass storage device which may include code 1430, in one embodiment. Further, an audio I/O 1424 may be coupled to second bus 1420. Note that other architectures are possible. For example, instead of the point-to-point architecture of FIG. 6, a system may implement a multi-drop bus or other such architecture.

Figure 7:
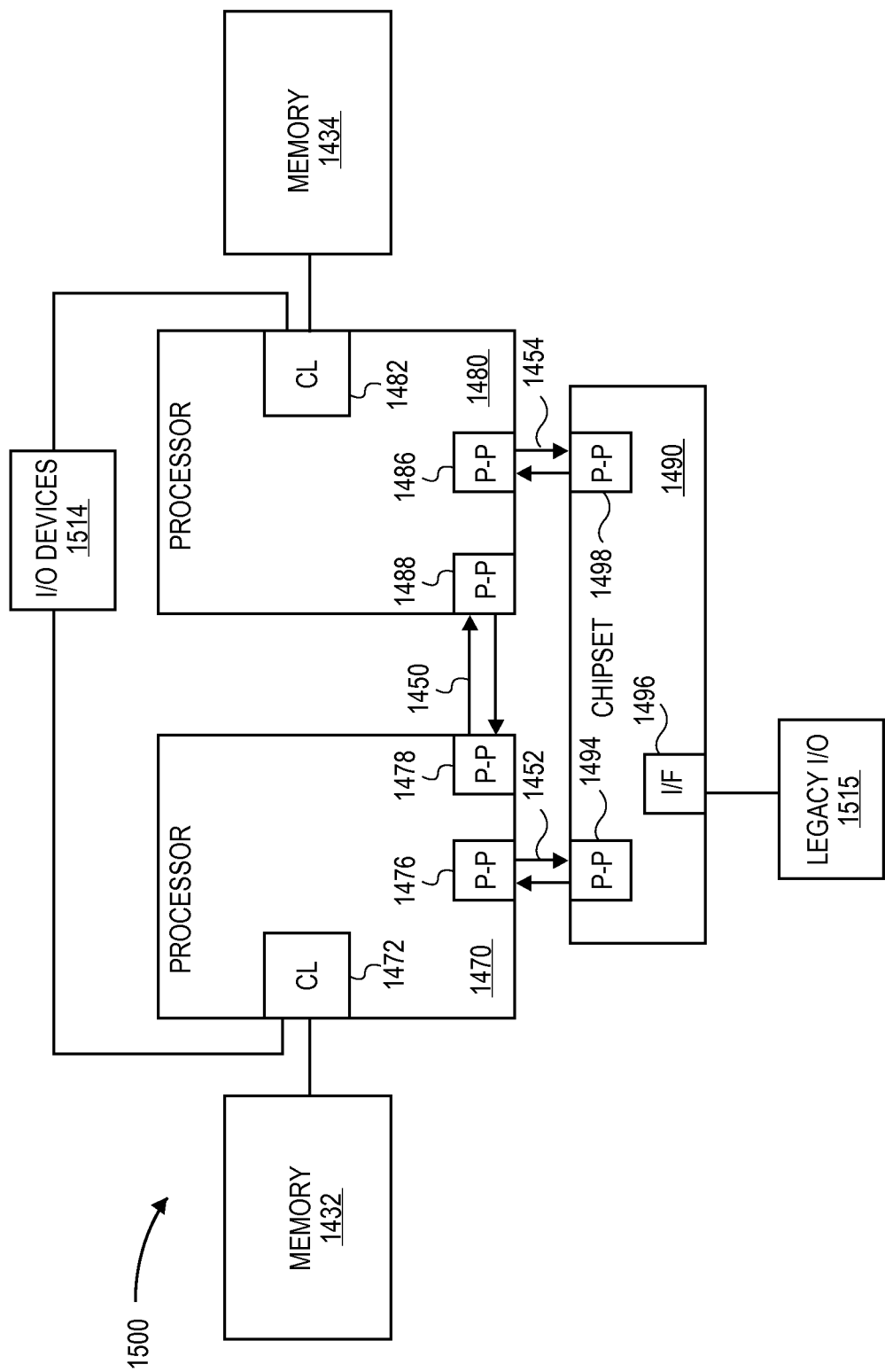
FIG. 7 is a block diagram of a third system 1500 in accordance with an embodiment of the invention.

Referring now to FIG. 7, shown is a block diagram of a third system 1500 in accordance with an embodiment of the present invention. Like elements in FIGS. 6 and 7 bear like reference numerals, and certain aspects of FIG. 7 have been omitted from FIG. 7 in order to avoid obscuring other aspects of FIG. 7.

FIG. 7 illustrates that the processing elements 1470, 1480 may include integrated memory and I/O control logic ("CL") 1472 and 1482, respectively. For at least one embodiment, the CL 1472, 1482 may include memory controller hub logic (IMC) such as that described above in connection with FIGS. 4 and 5. In addition, CL 1472, 1482 may also include I/O control logic. FIG. 7 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

In one embodiment, a system (e.g., 400, 1300, 1400, 1500, etc.) includes a processor (e.g., 405, 1310, 1315, 1470, 1480, etc.) having access to at least one real key. Memory is coupled to the processor. The memory stores at least one transformed key, the processor is configured to execute a key transform instruction to generate at least one transformed key based on the at least one real key. The memory may include a cache to store a mapping to map transformed keys to corresponding round keys that are based on the at least one real key. The processor is further configured to decrypt the transformed keys if a cache miss occurs. The mapping stored in the cache introduces a limited overhead of a transform key cache lookup. In an embodiment, the memory has limited storage for the transformed keys and the processor executes instructions to specify an index for selecting a transformed key. The memory may include a table or other structure, rather than the cache, to store a mapping to map transformed keys to corresponding real keys.

In an alternative embodiment, the processor is configured to receive a single key and automatically generate round keys to be stored and accessed by the processor. The processor is configured to execute the key transform instruction to generate at least one transformed key in response to generating at least one round key.

In one embodiment, a processor (e.g., 405, 1310, 1315, 1470, 1480, etc.) includes a processing unit (e.g., 1471) to retrieving at least one real key from a secure area and to generate at least one round key based on the at least one real key. Memory (e.g., cache 1481) is coupled to the processing unit. The processing unit is configured to execute a key transform instruction to generate at least one transformed key based on the at least one round key. The cache stores the at least one round key and the at least one transformed key. The at least one transformed key is an encrypted version of the at least one round key that is encrypted by the processor unit using a session key that may be randomly derived at power initialization. The processing unit (and no other machine) is able to decrypt the at least one transformed key and encrypt the at least one round key. In another embodiment, the at least one transformed key is an encrypted version of the at least one round key that is encrypted by the processor unit using a unique key for the processing unit that is derived and persisted internally through a derived key. The derived key may be obtained by fusing.

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived there from, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

What is claimed is:

1. A computer-implemented method, comprising:
retrieving at least one real key from a secure area;
executing, with a processor, an assist key generation instruction that assists in at least one round key generation based on retrieving the at least one real key; and
executing, with the processor, a key transform instruction to generate at least one transformed key in response to generation of the at least one round key;
storing the at least one transformed key in memory during multiple phases of an early platform boot of a platform;
decrypting the at least one transformed key with the processor that is associated with the platform; and
erasing the at least one round key from system memory.

2. The computer-implemented method of claim 1, wherein the at least one transformed key is an encrypted version of the at least one round key that is encrypted by the processor using the at least one real key, wherein the at least one real key comprises a session key that is randomly derived at power initialization, wherein only the processor is able to decrypt the at least one transformed key and encrypt the at least one round key.

3. The computer-implemented method of claim 1, wherein the at least one transformed key is an encrypted version of the at least one round key that is encrypted by the processor using the at least one real key, wherein the at least one real key comprises a unique key for the processor that is derived and persisted internally through a derived key that is based on fusing.

4. The computer-implemented method of claim 1, wherein the at least one transformed key comprises a plurality of transformed round keys.

5. The computer-implemented method of claim 1, wherein retrieving real keys from a secure area comprises unsealing real keys from a trusted platform module (TPM).

6. The computer-implemented method of claim 5, wherein the TPM interacts with the early platform boot to generate the transformed keys when the processor has executed limited software code to reduce the trusted code base and area of attack.

7. A non-transitory machine-accessible medium including data that, when accessed by a machine, cause the machine to perform operations comprising:
retrieving at least one real key from a secure area;
executing, with a processor, an assist key generation instruction that assists in at least one round key generation based on retrieving the at least one real key;
executing, with the processor, a key transform instruction to generate at least one transformed key in response to generation of the at least one round key;
storing the at least one transformed key in memory during multiple phases of an early platform boot of a platform;
decrypting the at least one transformed key with the processor that is associated with the platform; and
erasing the at least one round key from system memory.

8. The non-transitory machine-accessible medium of claim 7, wherein the at least one transformed key is an encrypted version of the at least one round key that is encrypted by the processor using the at least one real key, wherein the at least one real key comprises a session key that is randomly derived at power initialization, wherein only the processor is able to decrypt the at least one transformed key and encrypt the at least one round key.

9. A system, comprising:
a processor having access to at least one real key; and
memory coupled to the processor, the memory to store at least one transformed key and a mapping to map transformed keys to corresponding round keys that are based on the at least one real key, the processor to execute a key transform instruction to generate at least one transformed key based on the at least one real key to decrypt the transformed keys if a cache miss occurs.

10. The system of claim 9, wherein the memory has limited storage for the transformed keys and the processor executes instructions to specify an index for selecting a transformed key.

11. The system of claim 9, wherein the memory comprises a table or other structure to store a mapping to map transformed keys to corresponding real keys.

12. The system of claim 9, wherein the processor is configured to receive a single key and automatically generate a plurality of round keys to be stored and accessed by the processor, wherein the processor is configured to execute the key transform instruction to generate at least one transformed key in response to generating at least one round key.

13. A processor, comprising:
a processing unit to retrieve at least one real key from a secure area and to generate at least one round key based on the at least one real key; and
cache coupled to the processing unit, the processing unit is configured to execute a key transform instruction to generate at least one transformed key based on the at least one round key, wherein the cache to store the at least one round key and the at least one transformed key, wherein the at least one transformed key is an encrypted version of the at least one round key that is encrypted by the processor unit using a unique key for the processing unit that is derived and persisted internally through a derived key that is based on fusing.

* * * * *